(No Model.)
F. RANN.
SUBMARINE PIPE JOINT.
No. 529,806. Patented Nov. 27, 1894.
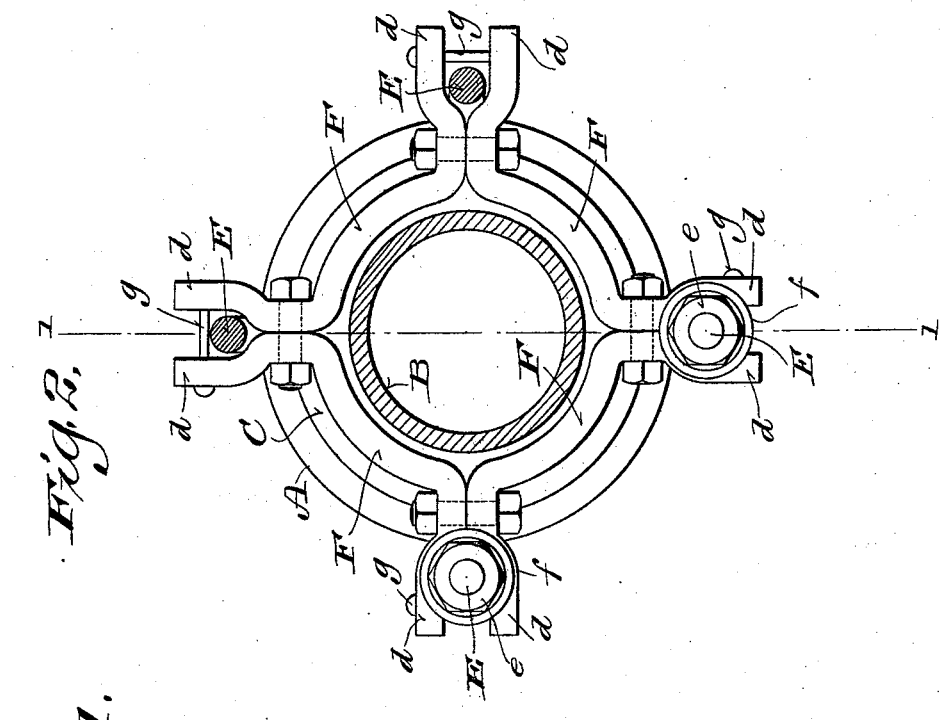
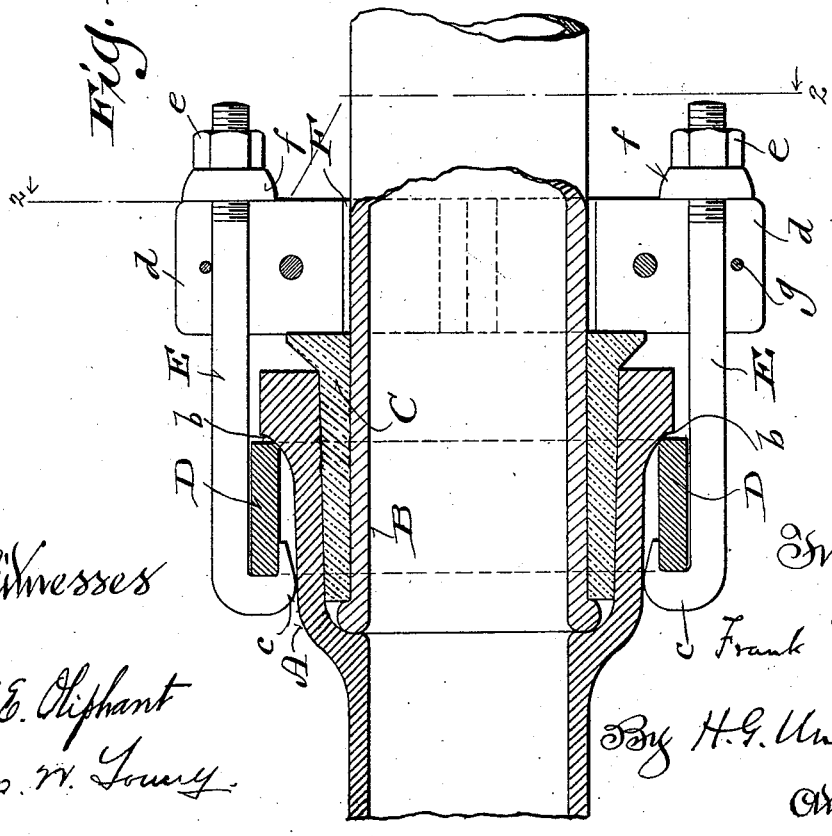
Witnesses
N. E. Oliphant
Geo. W. Lowry
Inventor
Frank Rann
By H. G. Underwood
Attorney

UNITED STATES PATENT OFFICE.

FRANK RANN, OF MILWAUKEE, WISCONSIN.

SUBMARINE-PIPE JOINT.

SPECIFICATION forming part of Letters Patent No. 529,806, dated November 27, 1894.

Application filed March 12, 1894. Serial No. 503,223. (No model.)

*To all whom it may concern:*

Be it known that I, FRANK RANN, a citizen of the United States, and a resident of Milwaukee, in the county of Milwaukee, and in the State of Wisconsin, have invented certain new and useful Improvements in Submarine-Pipe Joints; and I do hereby declare that the following is a full, clear, and exact description thereof.

My invention has for its object to provide a simple, strong and durable pipe-joint what may be readily made by a diver in various depths of water; and it consists in certain peculiarities of construction and combination of parts hereinafter described with reference to the accompanying drawings and subsequently claimed.

In the drawings: Figure 1 represents a longitudinal section of my sub-marine pipe-coupling taken on line 1—1 of the succeeding figure, and Fig. 2 an end elevation partly in section on line 2—2 of the preceding figure.

Referring by letter to the drawings A B represent the opposing bell and spigot ends of two sections of pipe. Cast on the spigot B to fit snug in the bell A is a lead collar C that constitutes the packing for the joint, and in practice it is preferable to true the interior of said bell for the purpose of insuring the best possible result as well as to facilitate the insertion of said spigot therein by a diver under water.

Arranged to bear against the exterior shoulder $b$ of the bell is a ring D of suitable strength, and engaging this ring at suitable intervals are hook-ends $c$ of bolts E, each of the latter being arranged between the opposing out-turned ends $d$ of segments F bolted together to form a ring on the spigot against the packing collar. The other ends of the bolts receive nuts $e$ and washers $f$ are arranged on said bolts intermediate of the nuts and adjacent ring.

To prevent the hook-bolts from springing out of place when the coupling is being made, I employ stay-pins $g$ that engage the ears $d$ of the spigot-ring, and while the latter is preferably of the construction herein shown and described, as a matter of strength and convenience, it may be otherwise than in sections having out-turned ends without departure from my invention. The packing collar is made long enough to extend outside the bell, and the nuts being run up on the bolts there is a clamping action against said collar that results in making the joint absolutely tight and proof against parting.

In making the joint the diver inserts the lead-collared spigot in the bell, and then adjusts the bolts, washers and nuts, it being understood that the rings have been previously arranged on said bell and spigot. It is also to be understood that in laying sub-marine pipe the majority of the pipe-sections are coupled in the usual manner above water, the herein described joint being only intended for the couplings that have to be made by a diver.

Having thus described my invention, what I claim as new, and desire to secure by Letters Patent, is—

1. A sub-marine pipe-joint that comprises a packing-collar on the spigot end of a pipe-section fitting in the bell-end of an opposing pipe-section, rings arranged on the bell and spigot, hook-bolts that pass through peripheral extensions of the spigot-ring and engage the bell-ring, washers on the bolts opposing the spigot-ring extensions, and nuts on said bolts in opposition to the washers, substantially as set forth.

2. A sub-marine pipe-joint that comprises a packing-collar on the spigot-end of a pipe-section fitting the bell-end of an opposing pipe-section, a series of segments that have out-turned ends and are bolted together to form a ring around the spigot against the packing collar, a ring on the bell, bolts arranged between opposing ends of the spigot-ring segments and terminated at one end in hooks engaging the bell-ring, stay-pins arranged to oppose outward spring of the bolts, washers on said bolts in opposition to said ends of the spigot-ring sections, and nuts on the aforesaid bolts against the washers, substantially as set forth.

In testimony that I claim the foregoing I have hereunto set my hand, at Milwaukee, in the county Milwaukee and State of Wisconsin, in the presence of two witnesses.

FRANK RANN.

Witnesses:
N. E. OLIPHANT,
HENRY DANKERT.